US012786966B2

(12) United States Patent
Tooher et al.

(10) Patent No.: US 12,786,966 B2
(45) Date of Patent: Nov. 3, 2026

(54) RECEIVING NODE CHANNEL ASSESSMENT

(71) Applicant: InterDigital Patent Holdings, Inc., Wilmington, DE (US)

(72) Inventors: J. Patrick Tooher, Montreal (CA); Aata El Hamss, Laval (CA); Paul Marinier, Brossard (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 814 days.

(21) Appl. No.: 17/917,691

(22) PCT Filed: Apr. 8, 2021

(86) PCT No.: PCT/US2021/026374
§ 371 (c)(1),
(2) Date: Oct. 7, 2022

(87) PCT Pub. No.: WO2021/207490
PCT Pub. Date: Oct. 14, 2021

(65) Prior Publication Data

US 2023/0156681 A1 May 18, 2023

Related U.S. Application Data

(60) Provisional application No. 63/129,907, filed on Dec. 23, 2020, provisional application No. 63/006,776, filed on Apr. 8, 2020.

(51) Int. Cl.
*H04W 72/0453* (2023.01)
*H04W 72/542* (2023.01)
*H04W 74/0808* (2024.01)

(52) U.S. Cl.
CPC ..... *H04W 72/0453* (2013.01); *H04W 72/542* (2023.01); *H04W 74/0808* (2013.01)

(58) Field of Classification Search
CPC ................................................ H04W 72/0453
See application file for complete search history.

(56) References Cited

U.S. PATENT DOCUMENTS

2016/0081010 A1* 3/2016 Seok ................ H04W 74/0808 370/329
2017/0013479 A1 1/2017 Sun et al.
(Continued)

FOREIGN PATENT DOCUMENTS

WO 2015/185989 A2 12/2015

OTHER PUBLICATIONS

3rd Generation Partnership Project (3GPP), RP-193259, "New SID: Study on Supporting NR from 52.6GHz to 71 GHz", Intel Corporation, 3GPP TSG RAN Meeting #86, Sitges, Spain, Dec. 9-12, 2019, 3 pages.
(Continued)

*Primary Examiner* — Derrick W Ferris
(74) *Attorney, Agent, or Firm* — Condo Roccia Koptiw LLP

(57) ABSTRACT

A wireless transmit/receive unit (WTRU) may receive configuration information that indicates resources on which channel assessments are to be performed. The configuration information may indicate a first set of resources associated with a first subband. The first subband may be associated with a first beam. The configuration information may indicate a second set of resources associated with a second subband. The second subband may be associated with a second beam. The WTRU may perform first channel assessments (e.g., first periodic channel assessments) using the first set of resources. The WTRU may perform second channel assessments (e.g., second periodic channel assessments) using the second set of resources. The WTRU may receive a request message to report channel assessment outcomes. Based on the request message, the WTRU may
(Continued)

send the channel assessment outcomes. The first subband may be indicated as available. The WTRU may monitor a transmission using the first subband.

17 Claims, 5 Drawing Sheets

(56) References Cited

U.S. PATENT DOCUMENTS

| | | | | |
|---|---|---|---|---|
| 2017/0230855 | A1 | 8/2017 | Hu | |
| 2019/0253200 | A1* | 8/2019 | Salem | H04W 74/0808 |
| 2020/0112988 | A1* | 4/2020 | Stauffer | H04W 74/006 |
| 2020/0396765 | A1* | 12/2020 | Liang | H04L 5/0057 |
| 2021/0105812 | A1* | 4/2021 | Rastegardoost | H04L 1/1671 |
| 2021/0251000 | A1* | 8/2021 | Sun | H04W 74/0808 |

OTHER PUBLICATIONS

3rd Generation Partnership Project (3GPP), TS 37.213 V16.0.0, "Technical Specification Group Radio Access Network, Physical Layer Procedures for Shared Spectrum Channel Access (Release 16)", Dec. 2019, pp. 1-25.

* cited by examiner

RECEIVING NODE CHANNEL ASSESSMENT

CROSS-REFERENCE TO RELATED APPLICATIONS

This application is the National Stage Entry under 35 U.S.C. § 371 of Patent Cooperation Treaty Application No. PCT/US2021/026374, filed Apr. 8, 2021, which claims the benefit of U.S. Provisional Application No. 63/006,776, filed Apr. 8, 2020, and U.S. Provisional Application No. 63/129,907, filed Dec. 23, 2020, the contents of which are incorporated by reference herein.

BACKGROUND

Mobile communications using wireless communication continue to evolve. A fifth generation may be referred to as 5G. A previous (legacy) generation of mobile communication may be, for example, fourth generation (4G) long term evolution (LTE).

SUMMARY

Systems, methods, and instrumentalities are described herein for receiver node channel assessment. A wireless transmit/receive unit (WTRU) may receive configuration information that indicates resources on which channel assessments are to be performed. For example, the configuration information may indicate a first set of resources associated with a first subband. The first subband may be associated with a first beam. The configuration information may indicate a second set of resources associated with a second subband. The second subband may be associated with a second beam. The WTRU may perform first channel assessments (e.g., first periodic channel assessments) using the first set of resources. The WTRU may perform second channel assessments (e.g., second periodic channel assessments) using the second set of resources. The WTRU may receive a request message to report channel assessment outcomes. Based on the request message, the WTRU may send the channel assessment outcomes. The channel assessment outcomes may include a first channel assessment outcome. The first channel assessment outcome may be that the first subband is available. The WTRU may monitor a transmission from a device, using the first subband. The channel assessment outcomes may include a second channel assessment outcome. The second channel assessment outcome may be that the second subband is busy. The first channel assessment outcome may include an outcome that the first subband is idle.

The WTRU may monitor a subband (e.g., a resource associated with the subband) if the subband is indicated as available. In an example, the WTRU may not monitor a subband that is indicated as busy and only monitor the subband(s) indicated as available.

The WTRU may determine a respective outcome for each channel assessment of the first channel assessments. The first channel assessment outcome may be for a most recent channel assessment of the first channel assessments, before a time when the request message is received. The channel assessment outcomes may be sent using the first subband that is available.

The WTRU may determine a parameter associated with a downlink transmission based on the channel assessment outcomes. The WTRU may receive, from the device, a third channel assessment outcome of a channel assessment by the device and determine, based on the third channel assessment outcome, a parameter that is to be used for a channel assessment by the WTRU.

DETAILED DESCRIPTION

Figure 1A:
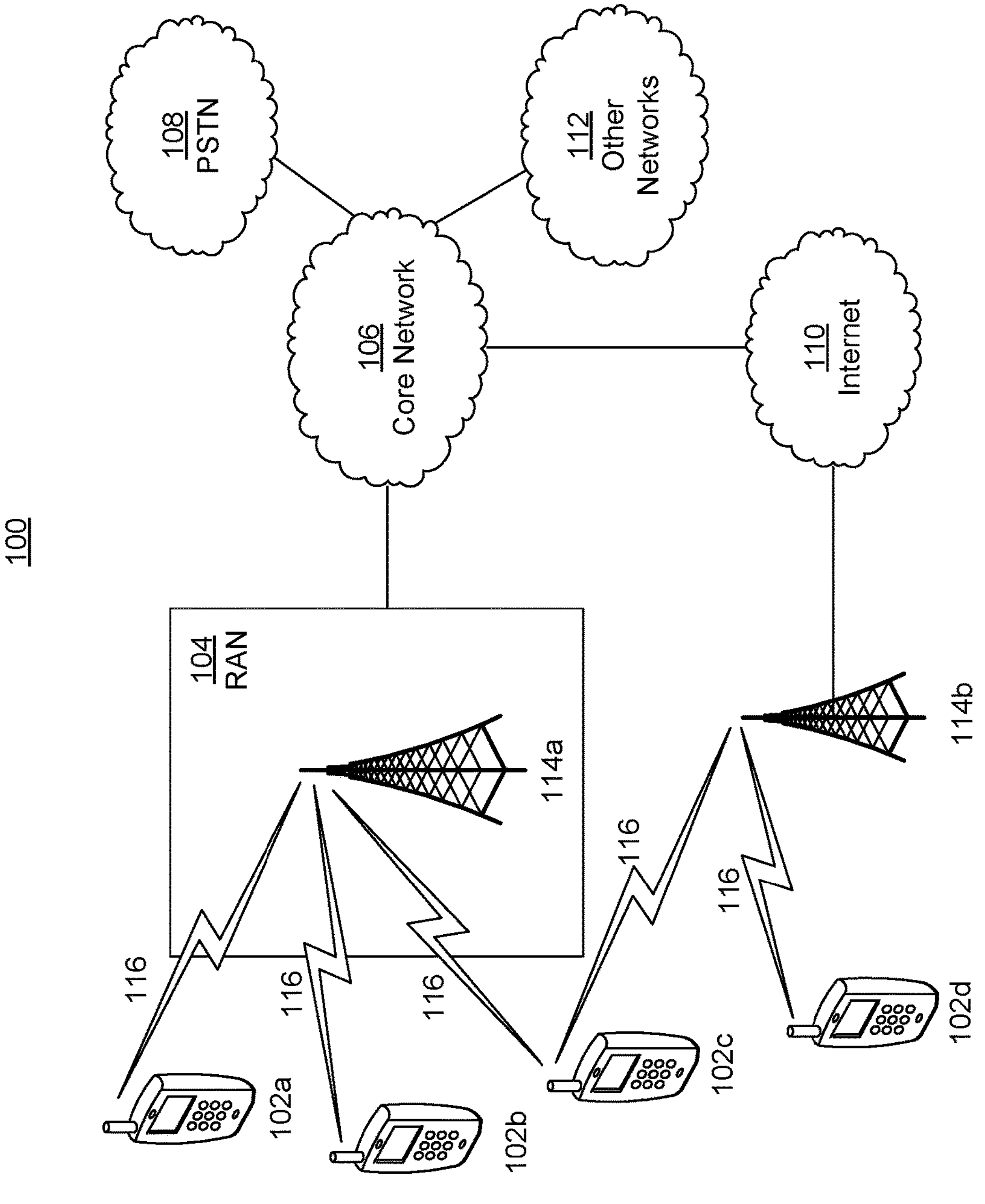
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) **102*a*, 102*b*, 102*c*, 102*d*, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102***a*, 102*b*, 102*c*, and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106/115, the Internet 110, and/or the other networks 112. By way of example, the base stations 114*a*, 114*b* may be a base transceiver station (BTS), a Node-B, an eNode B (eNB), a Home Node B, a Home eNode B, a gNode B (gNB), a NR NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
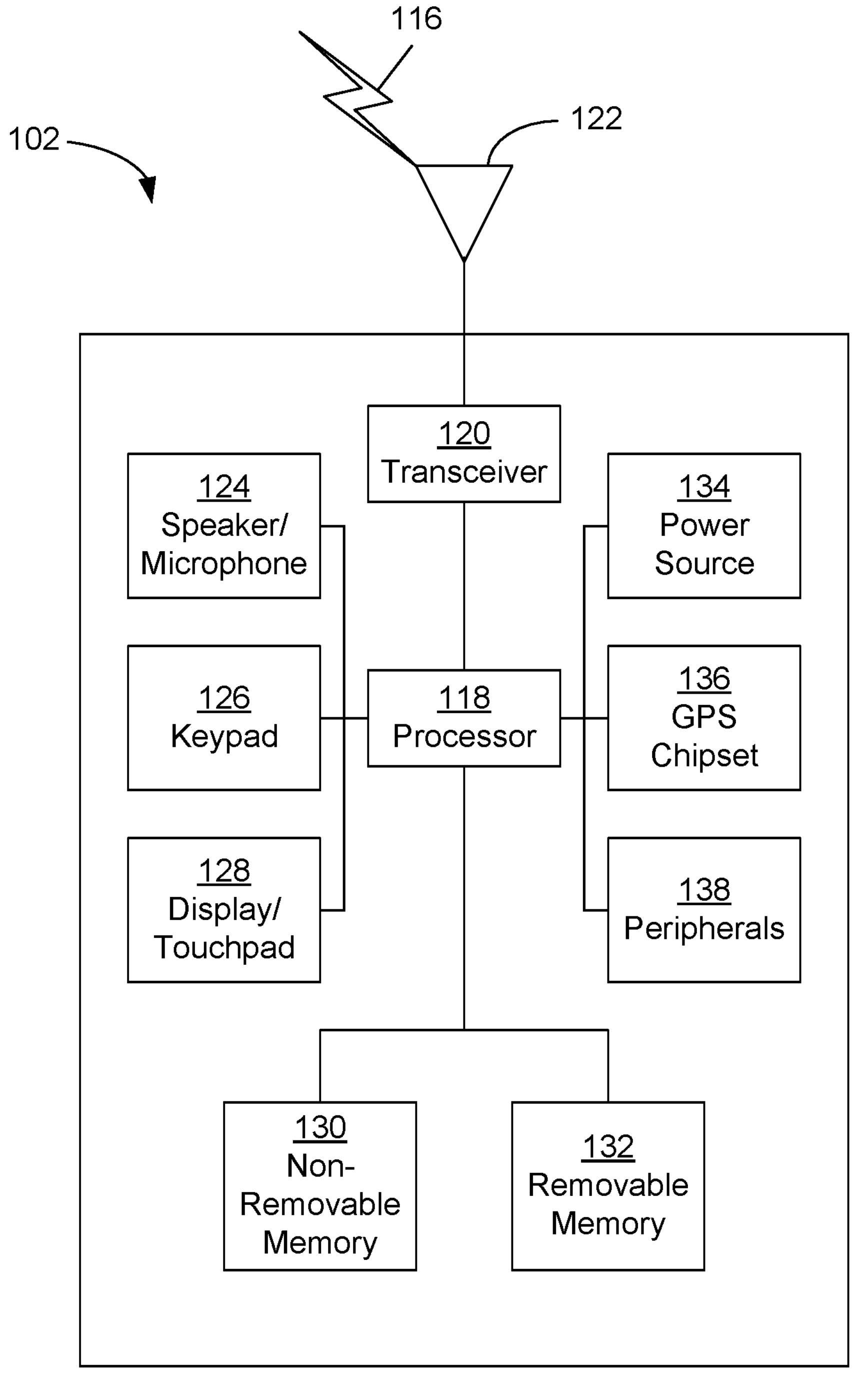
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ M IMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
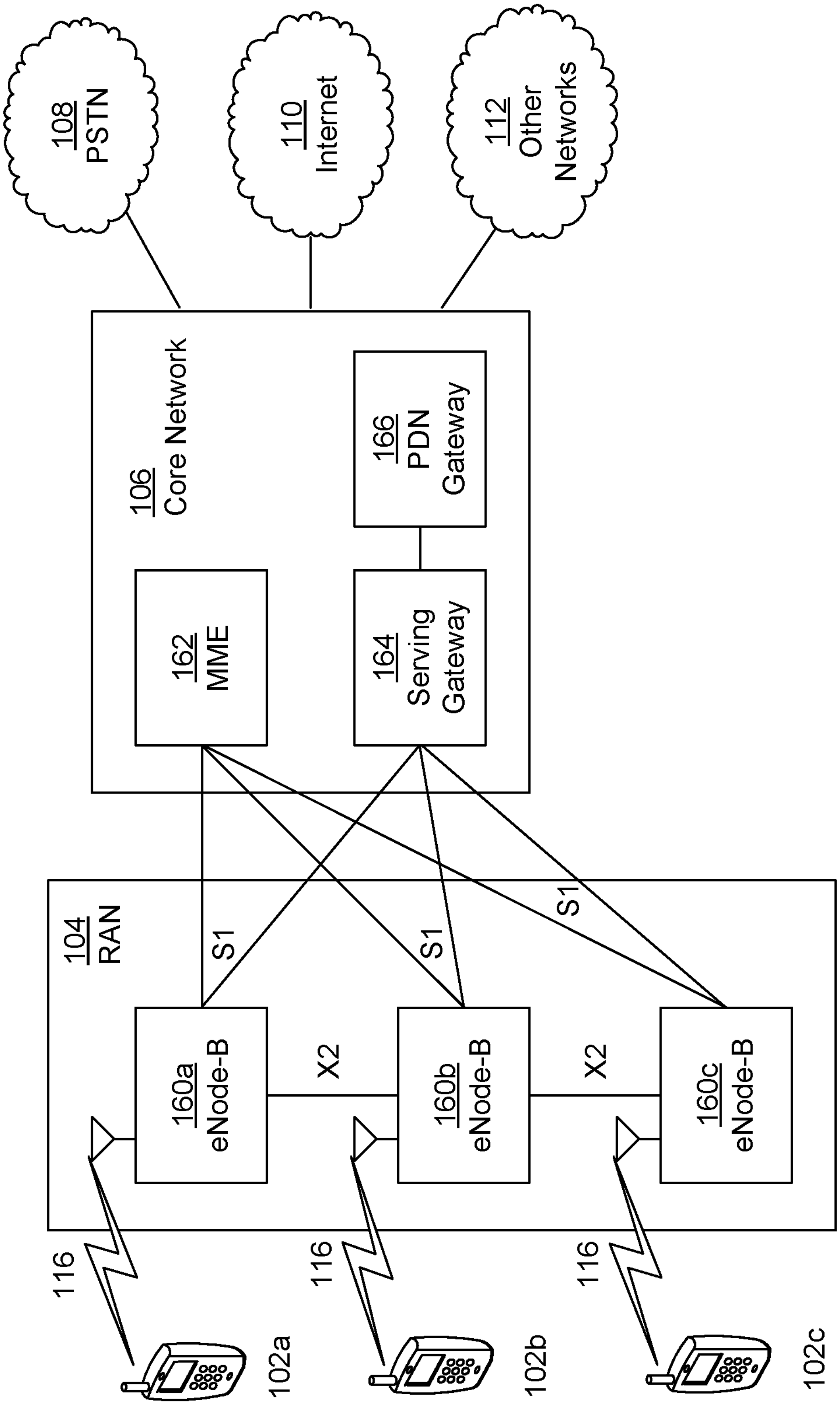
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
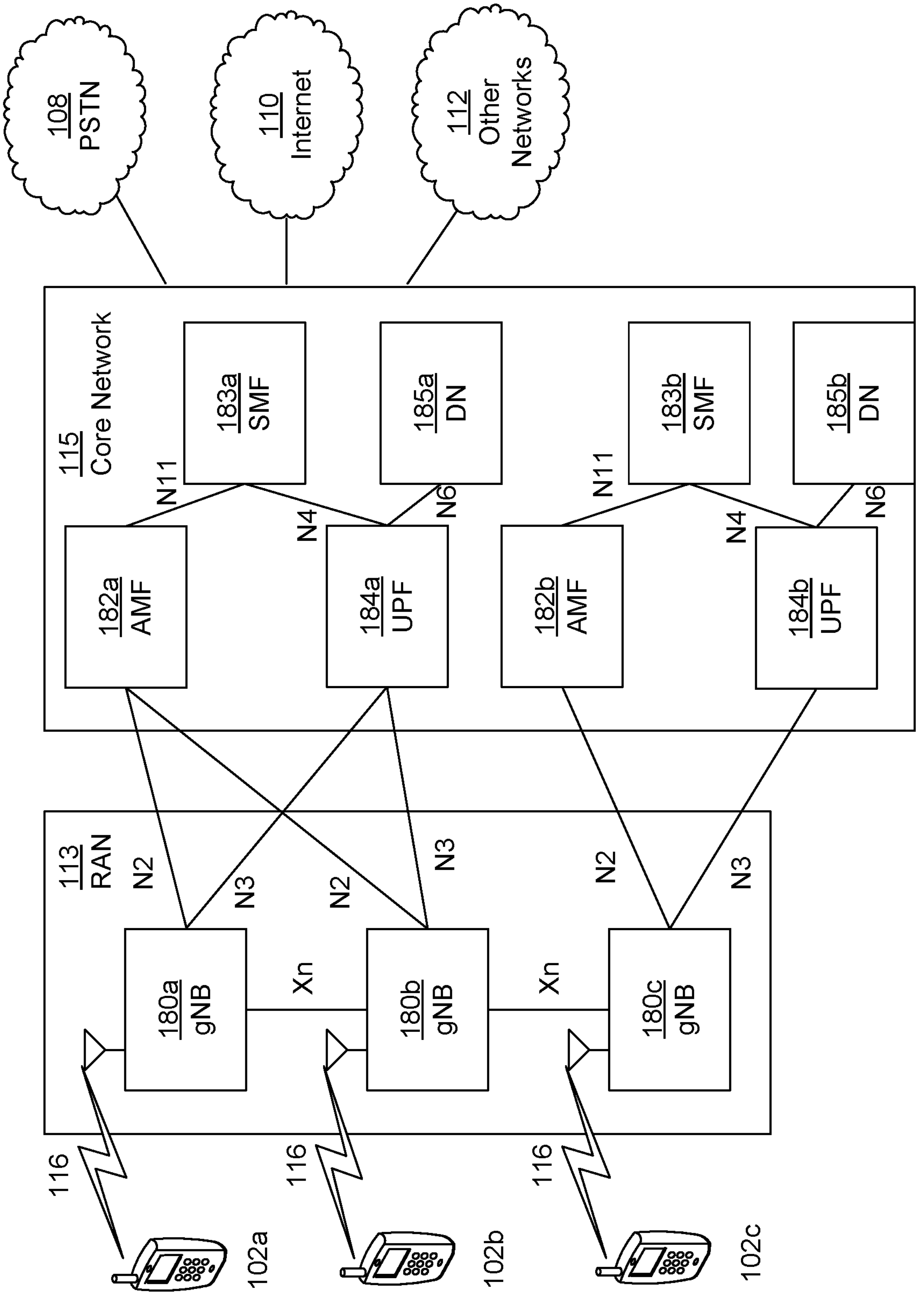
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*,184*b*, at least one Session Management Function (SMF) 183*a*, 183*b*, and possibly a Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different PDU sessions with different requirements), selecting a particular SMF 183*a*, 183*b*, management of the registration area, termination of NAS signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

New Radio (NR) may support the use of unlicensed bands, which may be referred to as NR-U. NR-U may support higher frequencies on unlicensed bands (e.g., above 52.6 GHz). NR may implement, for example, high data rate enhanced mobile broadband (eMBB), mobile data offloading, short range high data rate device-to-device (D2D) communication, and industrial Internet of Things (IoT). Frequency ranges above 52.6 GHz may contain larger spectrum allocation and large bandwidth. Transmissions on frequencies above 52.6 GHz may experience high phase noise, large propagation loss, low power amplifier efficiency, and strong power spectral density regulatory requirements. Channel access may be enhanced, for example, by considering potential interference to/from other nodes, assuming beam-based operation, and complying with the regulatory requirements applicable to unlicensed spectrum for frequencies between 52.6 GHz and 71 GHz.

Systems, methods, and instrumentalities are described herein for receiver node channel assessment. A wireless transmit/receive unit (WTRU) may be configured (e.g., semi-statically and/or dynamically) with resources to use for assessments (e.g., channel assessments). For example, a WTRU may be configured (e.g., semi-statically and/or dynamically) with resources on which to perform a receiver node listen-before-talk (LBT) procedure (receiver LBT). A WTRU may be triggered (e.g., dynamically) to perform receiver LBT. A WTRU may report the outcome of the receiver LBT (e.g., on the same or different set of resources that may be used for an associated transmission). A WTRU may be configured to perform periodic channel assessments (e.g., periodic receiver LBT). A WTRU may be triggered to report one or more outcomes of periodic channel assessments (e.g., periodic receiver LBT outcomes for a set of periodic receiver LBT processes). A WTRU may request that a receiving node perform a receiver LBT. A WTRU may monitor for (e.g., expect) a reception of a receiver LBT outcome and/or may receive a receiver LBT outcome, for example, prior to a configured transmission. Receiver node channel assessment and receiving node channel assessment may be used interchangeably herein.

An outcome of a channel assessment (e.g., a receiver LBT operation) may be sent, e.g., by a first WTRU. For example, the first WTRU may send an indication of channel assessment outcome(s) (e.g., whether a respective channel has been determined to be idle or busy). The indicated channel assessment outcomes(s) may be sent to a network node or a second WTRU, e.g., after receiver LBT operation(s) are performed.

The first WTRU may receive configuration information (e.g., via a configuration message) that indicates resources and perform respective channel assessments (e.g., LBT such as a receiver-assisted LBT) on the indicated resources. The first WTRU may determine respective channel assessment outcomes associated with the indicated resources. The first WTRU may receive an indication (e.g., a trigger) to report one or more channel assessment outcomes associated with the indicated resources, for example, from a transmitting node. The first WTRU may report the one or more channel assessment outcomes, for example, to the transmitting node. The transmitting node may be a network node, such as a base station or gNodeB, or, a second WTRU. The first WTRU may determine to receive and/or receive a transmission, for example, from the transmitting node, on a subband indicated as available or idle in the reported one or more channel assessment outcomes. The channel assessments and/or channel assessment outcome determinations may be periodic. The (e.g., each) respective channel assessment outcome may be clear/idle/available or busy/occupied. The one or more channel assessment outcomes may be associated with a subset of the indicated resources. The subset of the indicated resources may be the most recent set of resources or a specified subset of the indicated resources, for example, before a time when the trigger was received. The respective channel assessments may include a channel sensing or LBT operation.

The indicated channel assessment outcomes(s) may be sent, for example, in a hybrid automatic repeat request (HARQ)-acknowledge (ACK) report. LBT operations may be adapted based on (e.g., as a function of) the reception and/or contents of a receiver LBT report (e.g., indicating channel assessment outcomes(s)). Triggers may be used to trigger reporting of (e.g., periodic) receiver LBT operations (e.g., reporting that indicates channel assessment outcome(s)). A resource selection may be performed for reporting periodic receiver LBT. The report for periodic receiver LBT may include various contents. A WTRU may change its behavior(s) upon transmitting periodic receiver LBT report and/or upon determining the LBT has deemed the channel busy (e.g., declaring UL LBT failure or radio link failure (RLF) as a function of outcome(s) of receiver LBT). Parameters (e.g., CG parameters) may be selected as a function of reception of a receiver LBT indication.

A listen-before-talk (LBT) procedure may support fair channel access and coexistence. In an example, a transmitting node may evaluate an unlicensed channel (e.g., prior to transmission) by performing one or more channel assessments (e.g., LBT). For example, the transmitting node may ensure the channel is free of interference (e.g., before transmission). A node (e.g., a WTRU) may use channel assessment(s) (e.g., LBT) to avoid interference with transmissions by the node and to avoid interfering with transmissions by other nodes. Interference measured at a transmitter may not be the same as interference experienced at a receiving node. For example, there may be hidden nodes. An interfering node may be hidden from a transmitter (e.g., not detected by LBT) may still have negative consequences at the receiver. Channel access (e.g., at higher frequencies) may be performed using directional LBT, which may involve a transmitting node sensing the channel on a specific subband/beam. Beamforming may be used to transmit and/or receive signals in desired spatial directions. A spatial filter may be used (e.g., by a beamformer) for beamforming. A WTRU may (e.g., when using directional LBT) detect an interferer on the beam where it performs LBT. A detected interferer may affect the beam on which LBT is performed (e.g., the transmitter's transmit beam) while the detected interferer may not affect the receiver's receiving beam. The detected interferer may be referred to as an exposed node.

Receiving nodes may perform channel sensing (e.g., prior to the transmission), for example, to mitigate problems that may be caused by hidden nodes and exposed nodes. Channel sensing may be used to determine whether interference sensed at a transmitter is detrimental to a receiver. A transmitting node may (e.g., prior to transmission) perform channel assessment(s) (e.g., LBT). A receiving node may perform receiver node channel assessment(s) (e.g., receiver LBT). Receiver LBT may be performed by a receiving node, for example, prior to transmission(s).

Any node may perform any procedure disclosed herein. For example, a procedure that may be performed by a specific node (e.g., a WTRU) may be (e.g., additionally and/or alternatively) performed by another node (e.g., a gNB).

A receiver node channel assessment (e.g., a receiver LBT procedure) may be performed by a node. A WTRU may (e.g., receive an indication to) perform a receiver-based channel sensing operation such as a channel assessment, for example, to determine whether a channel is idle (e.g., from the WTRU's point of view). A receiver-based channel sensing operation may include a receiver LBT. A WTRU may perform receiver node channel assessment(s) on (e.g., specific) resources, which may be indicated to the WTRU. A WTRU may perform receiver node channel assessment(s) on one or more resources, which may include, for example, at least one of time resources, frequency resources, spatial resources and/or an LBT type. A transmitting node (e.g., gNodeB (gNB)) may send configuration information that indicates the resources to the WTRU.

Time resources may be defined, for example, in terms of slots, symbols, and/or absolute time. Frequency resources may be defined, for example, in terms of subbands (e.g., LBT subbands) and/or physical resource blocks (PRBs). In an example of a spatial resource, an indication may be provided to a WTRU to perform receiver node channel assessment(s) (e.g., receiver LBT) in an omni-directional manner and/or in a directional manner. An indication may provide the beam(s) on which to perform channel sensing, e.g., for directional receiver LBT. An indication may be implicit. For example, an indication may include a reference signal (RS) and/or a quasi co-location parameter. In an example of an LBT type, an indication provided to a WTRU may indicate the type of LBT to be performed for a receiver LBT (e.g., CAT4, 16 us CAT2 or 25 us CAT2 or a category defined specifically for receiver LBT). An indication may (e.g., additionally and/or alternatively) may indicate the priority class of the associated transmission, which may enable a WTRU to determine specific parameters of receiver node channel assessment(s).

A WTRU may perform receiver node channel assessment(s) (e.g., receiver LBT) on resources that may be determined, for example, as a function of an associated transmission and/or an associated reception resource. In an example, a WTRU may determine the resources for a receiver LBT, for example, based on the resources for an upcoming physical downlink shared channel (PDSCH) transmission and/or physical downlink control channel (PDCCH) transmission, e.g., including WTRU-specific downlink control information (DCI) and group-common DCI. A mapping may be configured for a WTRU between one or more receiver node channel assessment resources (e.g., resource(s) on which the WTRU may perform receiver node channel assessment(s)) and one or more of the following: a demodulation reference signal (DM-RS) resource of PDSCH (e.g., based on the sequence of the DM-RS of the last received PDSCH); a control resource set (CORESET) (e.g., on which a WTRU received the last DCI); a search space configuration (e.g., on which a WTRU received the last DCI, such as the search space index); and/or a bandwidth part (BWP) index of the active BWP.

Receiver node channel assessment(s) (e.g., receiver LBT) may be performed, for example, based on a trigger. A WTRU may be triggered to perform receiver node channel assessment(s), for example, based one or more of the following: an indication of an upcoming downlink (DL) transmission, a DCI indication, reception of a channel occupancy time (COT) indication, a sounding reference signal (SRS) trigger, hybrid automatic repeat request (HARQ) feedback polling, and/or an uplink (UL) transmission trigger.

In an example of receiver node channel assessment(s) that is triggered based on an indication of an upcoming DL transmission, a WTRU may receive an (e.g., explicit) indication (e.g., from the gNB) about an upcoming associated DL transmission.

In an example of receiver node channel assessment(s) that is triggered based on a DCI indication, a WTRU may detect a DCI (e.g., in a transmission that may not require receiver LBT) scheduling a DL transmission. A DCI detection may trigger receiver node channel assessment(s).

In an example of receiver node channel assessment(s) that is triggered based on reception of a COT indication, a WTRU may receive or detect a COT structure indication, which may be interpreted by the WTRU as indicating the resources of an active COT. The receipt and/or detection may trigger the WTRU to begin receiver node channel assessment(s) on one or more resources associated with the COT.

In an example of receiver node channel assessment(s) that is triggered based on an SRS trigger, a WTRU may be triggered to transmit SRS. The WTRU may indicate that the receiver node channel assessment(s) determined that a channel is idle, for example, by transmitting the SRS. A WTRU may determine specific parameters for an SRS, for example, based on the outcome of multiple instances of receiver node channel assessment(s).

In an example of receiver node channel assessment(s) that is triggered based on HARQ feedback polling, a WTRU may include the outcome of one or more instances of receiver node channel assessment(s), for example, if the WTRU transmits polled HARQ feedback.

In an example of receiver node channel assessment(s) that is triggered based on a UL transmission trigger, a WTRU may include the outcome of one or more instances of receiver node channel assessment(s) in a PUSCH transmission, for example, if the WTRU is triggered for a PUSCH transmission. A WTRU may encode the outcomes of receiver node channel assessment(s), for example, as uplink control information (UCI).

A WTRU may (e.g., if triggered to transmit in the UL), perform receiver node channel assessment(s) (e.g., receiver LBT) on a different set of resources than a set of resources for the UL transmission. For example, a WTRU may be triggered for a UL transmission on a first beam. LBT may be performed on the first beam. The WTRU may include the outcome of receiver LBT on one or more other beams.

A result of receiver node channel assessment(s) (e.g., receiver LBT) may be reported. For example, a WTRU may report the result of the receiver node channel assessment(s) to a gNB. A report may include, for example, the outcome of the receiver node channel assessment(s) (e.g., whether the channel was deemed idle and/or busy) and/or the resources on which the receiver node channel assessment(s) was performed. In an example, a WTRU may perform multiple instances of receiver node channel assessment(s) (e.g., each with its own set of resources). A WTRU may report multiple idle and/or busy outcomes (e.g., one per instance of receiver node channel assessment(s)).

A WTRU may receive an indication or may be configured with resources that the WTRU may use to report the outcome of the receiver node channel assessment(s) (e.g., receiver LBT). For example, a time/frequency/spatial resource may be indicated to a WTRU to report the outcome of multiple instances of receiver node channel assessment(s). Instances may be on the same or different resources as resources used by a WTRU to report outcome(s). For example, a WTRU may receive an indication or may be configured with a beam on which to report the outcome of multiple receiver node channel assessments performed on a set of beams. The set of beams may or may not include the beam used for reporting the outcome.

A receiver node channel assessment(s) (e.g., receiver LBT) may qualify as the channel assessment (e.g., LBT) that is to be performed for a transmission that reports one or more outcomes of channel assessments. A receiver node channel assessment(s) performed by a WTRU may be the channel assessment (e.g., required by the WTRU) to perform a transmission indicating the outcome of one or more instances of the receiver node channel assessment(s). For example, a WTRU may (e.g., receive an indication to) perform receiver node channel assessment(s) on a first beam and may be provided resources to report the outcome of the receiver node channel assessment(s), e.g., on the same beam. A WTRU may consider a channel to be successfully acquired to transmit the outcome of the receiver node channel assessment(s) to the gNB, for example, if the receiver node channel assessment(s) determines the channel is idle. In some examples, a WTRU may (e.g., receive an indication to) perform receiver node channel assessment(s) on a first beam and may be provided resources on a second beam to provide the outcome of the receiver node channel assessment(s). A WTRU may perform a channel assessment on the second beam, for example, to acquire the channel prior to transmitting the outcome of the receiver node channel assessment(s).

A WTRU may (e.g., implicitly) indicate that receiver node channel assessment(s) (e.g., receiver LBT) deemed the channel busy. In an example, an implicit indication may be achieved, for example, by the WTRU not reporting the outcome of the receiver node channel assessment(s) for a set of resources.

A WTRU may indicate that receiver node channel assessment(s) (e.g., receiver LBT) deemed a channel idle, for example, by transmission of a signal on the channel. For example, a WTRU may perform receiver node channel assessment(s) and may determine that a channel is idle. The WTRU may transmit a signal on the same beam (e.g., same beam pair). The signal may be, for example, an RS-like signal with a sequence, e.g., to identify the WTRU. The signal may be a transmission that provides information about the outcome of one or more instances of receiver node channel assessment(s).

A receiver node channel assessment(s) (e.g., receiver LBT) reporting procedure may be implemented. For example, a WTRU may (e.g., be configured to or may receive an indication to) report the outcome of receiver node channel assessment(s), e.g., prior to an associated DL transmission, which may be deemed a handshake procedure. The WTRU may determine not to monitor (e.g., attempt to decode) the associated DL transmission on a channel that is been indicated as busy. The WTRU may not monitor (e.g., expect) the associated DL transmission, for example, unless the WTRU has indicated (e.g., to the gNB) that the receiver node channel assessment(s) deemed the channel idle.

A WTRU may (e.g., be configured to or may receive an indication to) report the outcome of receiver node channel assessment(s) (e.g., receiver LBT), for example, after the timing of the associated DL transmission. For example, a WTRU may report the outcome of receiver node channel assessment(s) in conjunction with reporting HARQ-acknowledge (ACK) for the associated transmission. In an example, a WTRU may indicate (e.g., to a gNB) if a channel was deemed occupied or busy at the time of an associated DL transmission, which may provide information as to whether decoding was affected by the presence of a hidden node during the DL transmission.

In an example (e.g., one or more receiver LBT reporting examples herein), a WTRU may receive a DL assignment (e.g., DL resource allocation). The WTRU may be triggered to perform channel assessment (e.g., channel sensing) for a DL assignment that is associated with the channel sensing. In examples, the WTRU may be triggered to perform receiver node channel assessment(s) (e.g., receiver LBT) for a DL assignment that is associated with the receiver node channel assessment(s). The receiver node channel assessment(s) may include a LBT operation (e.g., LBT procedure) associated with a resource that may be used for receiving a DL transmission. The receiver node channel assessment trigger (e.g., the receiver LBT trigger) may be part of a DCI (e.g., a first DCI) that the WTRU receives and/or that provides the DL assignment. The receiver node channel assessment trigger may be received by the WTRU in another DL transmission (e.g., a second DCI). The second DCI may be a dedicated DCI. The WTRU may determine an outcome of the receiver node channel assessment(s) prior to, during, or after the timing of the DL assignment. The WTRU may perform receiver node channel assessment(s) prior to, during, or after receiving the DL assignment based on one or more of: a determination whether there is a gap between the receiver node channel assessment trigger and the timing of the DL assignment, or the size of the gap between the receiver node channel assessment trigger and the timing of the DL assignment. For example, depending on if there is a gap between the receiver node channel assessment trigger and the timing of the DL assignment, or depending on the size of such a gap, the WTRU may perform receiver node channel assessment(s) prior to receiving the DL assignment.

The WTRU may include outcome(s) of one or more receiver node channel assessment(s) (e.g., receiver LBT) in a HARQ-ACK report (e.g., a HARQ-ACK report occurring after an associated DL assignment). A WTRU may append one or more (e.g., all) receiver node channel assessment outcomes to the HARQ-ACK report. In some examples, a WTRU may determine whether to report the outcome(s) of one or more receiver node channel assessment(s) based on one or more parameters or conditions. A WTRU may provide one or more receiver node channel assessment outcomes based on one or more of the HARQ-ACK status (ACK or NACK), block error rate (BLER), or SINR of one or more transport block (TB) or code block group (CBG). For example, the WTRU may report the outcome of one or more receiver node channel assessment(s) if (e.g., only if) a set of TBs or a set of CBGs is determined to be NACK. In another example, the WTRU may report the outcome(s) of one or more receiver node channel assessment(s) if a signal to interference and noise ratio (SINR) value associated to a TB or a set of CBGs is above or below a threshold.

A WTRU may be configured to store (e.g., hold) the outcome(s) of one or more receiver node channel assessments (e.g., receiver LBT operations) and report the outcome(s), for example, if triggered or polled by a transmitting node (e.g., a gNB). For example, a transmitting node (e.g., gNB) may configure a WTRU to perform receiver node channel assessment(s) (e.g., receiver LBT) prior to a set of DL transmissions. The transmitting node may send configuration information that indicates resources to the WTRU. The WTRU may perform the one or more channel assessments using the resources indicated in the configuration information. The WTRU may report the outcome of a set of receiver node channel assessments (e.g., receiver LBT procedures) at a future time, for example, when polled by a gNB. The transmitting node may send a request message (e.g., a trigger) that requests the WTRU to report the outcome of the one or more receiver node channel assessments, to the WTRU. The transmitting node may determine which resource to use to send a transmission.

A WTRU may be configured with resources to report the outcome of one or more receiver node channel assessment(s) (e.g., receiver LBT). A report may be considered UCI and/or may be multiplexed with other UCI. A WTRU may determine whether to report the outcome of one or more receiver node channel assessments, for example, based on the outcome itself. In an example, a WTRU may (e.g., autonomously) determine when to report the outcome(s) of one or more receiver node channel assessments, for example, based on whether one or more receiver node channel assessments determined a channel was idle. A WTRU determination (e.g., when to report) may be considered a form of autonomously triggered UCI report. In an (e.g., additional and/or alternative) example, a WTRU may perform receiver node channel assessment(s), for example, based on determining there is an active COT. A WTRU may be triggered to report the outcome of receiver node channel assessment(s) performed on one or more resources of a COT, for example, if the WTRU does not detect a DL transmission during an active COT or during a portion of an active COT.

An associated transmission may be selected, for example, based on an outcome of receiver node channel assessment(s) (e.g., receiver LBT). In an example, a WTRU may be provided multiple DL assignments for a transmission. A WTRU may select, for example, based on the outcome of receiver node channel assessment(s) performed on resources tied to at least one of the multiple DL assignments, one or more appropriate DL assignments to decode. For example, a WTRU may receive one or more DCIs for a transmission pointing to multiple sets of resources for a scheduled DL transmission. A WTRU may perform receiver node channel assessment(s) on resources associated with an (e.g., each possible) instance of the DL transmission. A WTRU may attempt to decode/decode a DL transmission on a set of resources, for example, upon receiver node channel assessment(s) determining that a first set of resources associated with an instance of the DL transmission is idle. A WTRU may indicate the instance of a DL transmission used for decoding, which may implicitly indicate (e.g., to a gNB) the resources associated with an idle channel determination by the receiver node channel assessment(s).

A WTRU may adapt behaviors when receiving receiver node channel assessment reports (e.g., receiver LBT report(s).

A WTRU may receive a receiver node channel assessment report (e.g., receiver LBT report), for example, prior to an UL (or SL) transmission. The WTRU may adapt a channel assessment (e.g., a subsequent LBT operation) based on the reception and/or contents of a receiver node channel assessment report. For example, if the WTRU is indicated from an intended receiving node that a subband and/or beam is busy (e.g., occupied), the WTRU may modify a subsequent channel assessment on that subband and/or beam (e.g., the subsequent LBT may be more conservative or restrictive). In examples, the WTRU may use parameters (e.g., LBT parameters) that are less likely to result in a subsequent transmission (e.g., parameters that are more likely to assume a subband and/or beam is busy). The parameters of a subsequent channel assessment that may be modified based on (e.g., as a function of) the reception and/or the contents of a receiver node channel assessment report may include one or more of: contention window size(s), beam(s) and/or subband(s) on which to perform channel assessment(s), LBT category(ries), channel access priority class (CAPC)(s), clear channel assessment (CCA) threshold(s), random backoff duration(s), or channel assessment bandwidth(s) (e.g., LBT bandwidth(s)).

Figure 2:
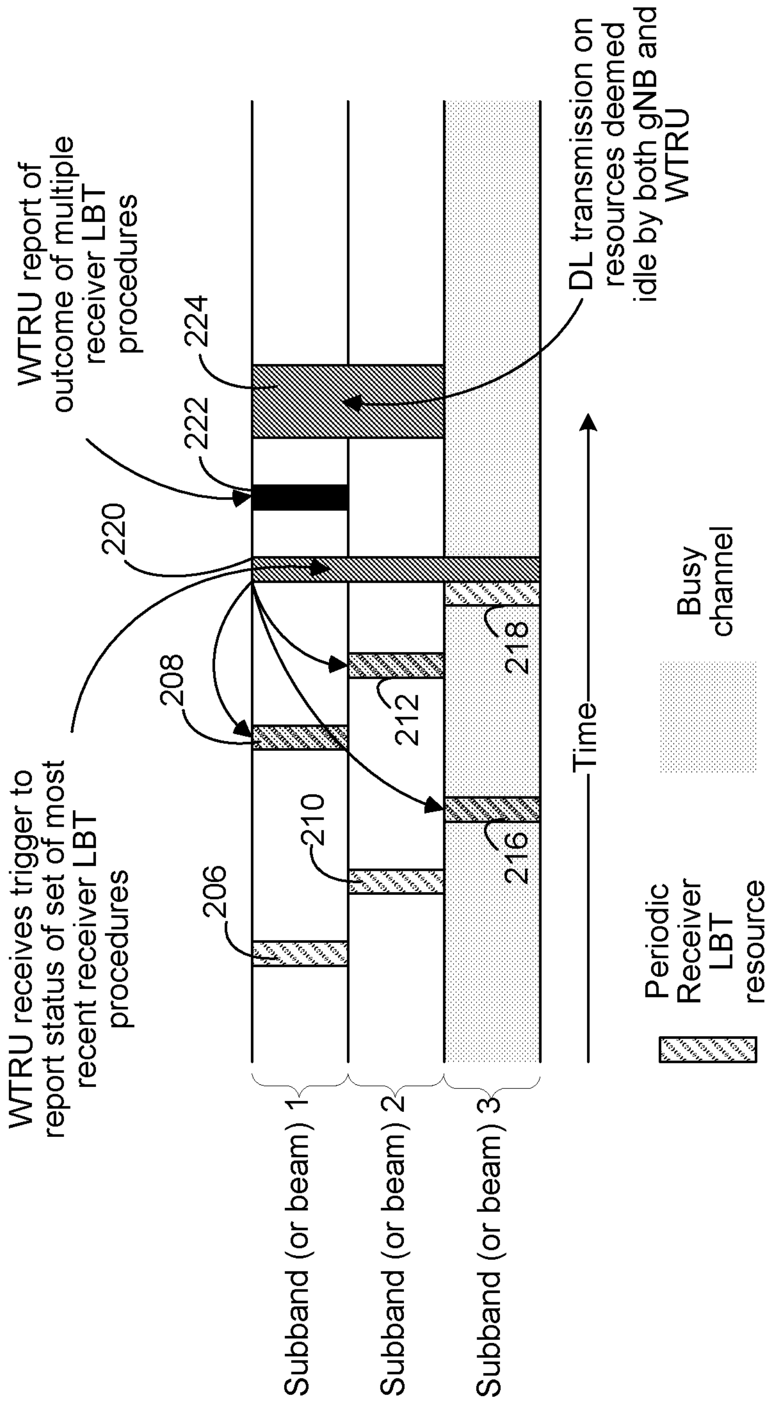
FIG. 2 shows an example of a WTRU using periodic receiver node channel assessment resources.

A periodic receiver node channel assessment(s) (e.g., periodic receiver LBT) may be implemented. For example, a WTRU may be configured with periodic resources on which it may perform receiver node channel assessment(s) (e.g., via configuration message(s) that indicates the resources). The WTRU may receive configuration information. The configuration information may indicate one or more subbands (e.g., subbands 1-3 as shown in FIG. 2). The configuration information may indicate one or more beams (e.g., beams 1-3 as shown in FIG. 2). The configuration information may indicate one or more of the following: one or more resources (e.g., resources 206-218 as shown in FIG. 2), the periodicities associated with the one or more resources, and/or the time offsets associated with the one or more resources. In examples, configuration information may indicate a first set of resources (e.g., including resource 206 and resource 208, as shown in FIG. 2) associated with a first subband (subband 1 as shown in FIG. 2) and/or associated with a first beam (e.g., beam 1 in FIG. 2). The configuration information may indicate a second set of resources (e.g., including resource 216 and resource 218, as shown in FIG. 2) associated with a second subband (subband 3 as shown in FIG. 2) and/or associated with a second beam (e.g., beam 3 in FIG. 2). An (e.g., each) instance of a periodic resource (e.g., a PRB or a set of resource elements (REs)) for receiver node channel assessment(s) may assume similar parameters (e.g., as shown in FIG. 2, using a certain beam, using a certain subband, or using a certain periodicity). For example, an (e.g., each) instance may assume a single beam and/or a single subband. As shown in FIG. 2, resource 206 resource 208 may be associated with subband 1 (or beam 1). As shown in FIG. 2, resource 206 on subband 1 (or beam 1) and resource 208 on subband 1 (or beam 1) may be associated with one or more of a first periodicity, a first time offset, or a first set of REs. Periodic (instances of) channel assessments using resource 206 and resource 208 may be associated with the first periodicity. As shown in FIG. 2, resource 210 resource 212 may be associated with subband 2 (or beam 2). As shown in FIG. 2, resource 210 on subband 2 (or beam 2) and resource 212 on subband 2 (or beam 2) may be associated with one or more of a second periodicity, a second time offset, or a second set of REs. Periodic channel assessments using resource 210 and resource 212 may be associated with the second periodicity. As shown in FIG. 2, resource 216 resource 218 may be associated with subband 3 (or beam 3). As shown in FIG. 2, resource 216 on subband 3 (or beam 3) and resource 218 on subband 3 (or beam 3) may be associated with one or more of a third periodicity, a third time offset, or a third set of REs. Periodic channel assessments using resource 216 and resource 218 may be associated with the third periodicity. In examples, the first periodicity, the second periodicity, and the third periodicity may be different. In examples, one or more of the first periodicity, the second periodicity, and the third periodicity may be the same. As shown in FIG. 2, receiver node channel assessment(s) may occur on a channel (e.g., on a subband 1 in FIG. 2) periodically. A WTRU may perform receiver node channel assessment(s) (e.g., one or more respective periodic receiver node channel assessment on resources of one or more instances of a periodic receiver node channel assessment) without being scheduled (e.g., without being dynamically scheduled) to perform the receiver node channel assessment(s). In examples, a WTRU may perform the respective receiver node channel assessment autonomously or preemptively. The WTRU may receive configuration information (e.g., from a base station) that indicates one or more sets of resources. The WTRU may perform a first channel assessment (e.g., a first receiver node channel assessment) based on the configuration information and/or store the outcome of the first channel assessment. The WTRU may perform a second channel assessment (e.g., a second receiver node channel assessment) based on the configuration information, for example, without being scheduled to perform the second channel assessment, and/or store the outcome of the second channel assessment. The first channel assessment and the second channel assessment may be performed on different resources indicated in the configuration information.

Periodic receiver node channel assessment resources (e.g., receiver LBT resources) may be activated or deactivated. Activation or deactivation may be performed, for example, by at least one of dynamic signaling, RRC configuration, a measurement value, and/or time.

In an example of dynamic signaling, a WTRU may receive a DCI indicating an activation/deactivation of periodic receiver node channel assessment resources. In an (e.g., additional and/or alternative) example, the reception of a signal, such as a COT structure indication or COT activation, may activate/deactivate periodic receiver node channel assessment resources.

In an example of a measurement value, a WTRU may activate/deactivate periodic receiver node channel assessment resources, for example, based on measurements (e.g., reference signal received power (RSRP), received signal strength indicator (RSSI), signal-to-interference-plus-noise ratio (SINR), channel quality indicator (CQI), channel occupancy (CO), and so on). A WTRU may activate or deactivate periodic receiver node channel assessment resources, for example, if a measurement goes above or below a threshold.

In an example of time, a WTRU may activate or deactivate a receiver node channel assessment resource, for example, based on the time since a previous activation or deactivation. In an example, a WTRU may activate a periodic receiver node channel assessment resource, for example, if there is an indication that a COT has begun and may deactivate the periodic receiver node channel assessment resource, e.g., when a certain amount of time has elapsed since activation.

A WTRU may be configured with resources on which to report the outcome of receiver node channel assessment(s) (e.g., receiver LBT) performed on periodic resources. Feedback resources may be, for example, aperiodic (e.g., triggered by a gNB or a WTRU), periodic, or semi-persistent. A WTRU (e.g., configured with periodic or semi-persistent feedback resources) may be configured, for example, with a relationship between a resource on which receiver node channel assessment(s) is performed and a resource in which the outcome is reported. A WTRU (e.g., triggered to report the outcome of receiver node channel assessment(s) on one or more periodic resources) may receive an indication or may be configured with a reference resource (e.g., periodic receiver node channel assessment resource) associated with a feedback report.

A WTRU may be provided (e.g., allocated or assigned) or indicated a set of resources on which it may provide a receiver node channel assessment report (e.g., perform receiver LBT on the set of resources and provide the outcome of the receiver LBT). The WTRU may select a subset of resources of the set of resources on which to transmit the receiver node channel assessment report. The selection of the subset of resources may be determined based on (e.g., as a function of) one or more of: prioritization of resources, channel acquisition, receiver node channel assessment outcome(s), timing, and/or the like.

The selection of the subset of resources may be determined based on prioritization of resources. For example, a (e.g., each) resource may be assigned an index and the WTRU may transmit the receiver node channel assessment report on the resource with the highest or lowest index value, for which it has successfully acquired the channel (e.g., a resource located on one or more channel(s) where the WTRU has determined the channel is idle as per a channel access mechanism such as LBT).

The selection of the subset of resources may be determined based on channel acquisition. For example, the WTRU may transmit on one or more (e.g., all) resources for which it has determined (e.g., via successful LBT) the one or more channel(s) is/are free (or idle) to transmit on.

The selection of the subset of resources may be determined based on (e.g., as a function of) receiver node channel assessment outcome(s). For example, the WTRU may select the resource on which to transmit the receiver node channel assessment report as a function of the set of resources on which the receiver node channel assessment(s) determines the channel was idle or busy.

The selection of the subset of resources may be determined based on timing. For example, the WTRU may transmit the receiver node channel assessment report on a resource occurring at a time that is determined as a function of the timing of the receiver node channel assessment(s) (e.g., receiver LBT procedure). In an example, the WTRU may transmit the receiver node channel assessment report on the earliest resource for which it has acquired the channel to transmit.

A WTRU may report multiple receiver node channel assessment outcomes in a feedback resource. In an example, a WTRU may provide multiple outcomes of multiple instances of a periodic receiver node channel assessment resource. In an (e.g., additional and/or alternative) example, a WTRU may provide multiple outcomes of multiple periodic receiver node channel assessment resources.

FIG. 2 shows an example of a WTRU using periodic receiver node channel assessment resources. The WTRU may be scheduled for receiving a DL transmission. In examples, a WTRU may perform channel assessments using the resources indicated in the configuration information to determine which subband is available for what beam. FIG. 2 shows an example of a WTRU configured with resources (e.g., periodic receiver LBT resources), for example, in three subbands, in three beams, or in three sets of subband/beam resources (e.g., PRBs or REs associated with certain periodicities), on which channel assessments are to be performed. A WTRU may perform a channel assessment (e.g., clear channel assessment measurements such as LBT operations) on indicated or configured resources (e.g., the periodic receiver LBT resources). For example, the WTRU may perform a respective channel assessment on a (e.g., each) configured resource (e.g., receiver LBT resource). As shown in FIG. 2, a WTRU may perform first periodic channel assessments using the first set of resources including resource 206 and resource 208. As shown in FIG. 2, a WTRU may perform second periodic channel assessments using the second set of resources including resource 216 and resource 218. In some examples, the resources in FIG. 2 may have been activated, for example, dynamically, e.g., by a transmission from a gNB.

A WTRU may be triggered to report the status (e.g., the outcome) of one or more of channel assessments. As shown in FIG. 2, the WTRU may receive a request message (e.g., a trigger 220) to report the one or more of channel assessment outcomes. As shown in FIG. 2, a WTRU may be triggered to report the status (e.g., the outcome) of the most recent channel assessments (e.g., the most recent receiver LBT operations in each of) the three sets of resources, for example, a report associated with a subset of the configured resources. The most recent channel assessment (e.g., the most recent receiver LBT operation) may be the last or the last instance of channel assessment before the trigger was received. A WTRU may (e.g., as shown by example in FIG. 2) select a result from a previous instance of periodic resources (e.g., the three periodic receiver LBT resources 208, 212, and 216 in FIG. 2). In an example for the third set of resources (e.g., subband 3 or beam 3), a WTRU may select a result from a previous instance of periodic resources, for example, due to the timing of a trigger, e.g., with respect to the timing of the periodic resource. For example, a WTRU may not have enough processing time to perform the measurement in the most recent instance (e.g., the WTRU may not include the periodic receiver LBT resource 218 in subband 3 closest to the trigger in the report, for example because it may not have had time to process that receiver LBT resource 218).

A WTRU may send one or more of channel assessment outcomes based on the request message. A WTRU may report the outcomes (e.g., clear/idle/available or busy) of multiple channel assessments (e.g., LBT processes) in multiple periodic resources (e.g., for multiple instances of a resource or over a single instance of a resource). The one or more channel assessment outcomes may include a first channel assessment that a first subband (e.g., subband 1 in FIG. 2) is available. The one or more channel assessment outcomes may include a second channel assessment that a second subband (e.g., subband 3 in FIG. 2) is busy. An outcome of a channel assessment may be that a channel (e.g., a subband, a beam, or a set of REs or PRBs associated with the channel) is clear. An outcome of a channel assessment may be that a channel (e.g., a subband, a beam, or a set of REs or PRBs associated with the channel) is idle. An outcome of a channel assessment may be that a channel (e.g., a subband, a beam, or a set of REs or PRBs associated with the channel) is available. An outcome of a channel assessment may be that a channel (e.g., a subband, a beam, or a set of REs or PRBs associated with the channel) is unavailable. An outcome of a channel assessment may be that a channel (e.g., a subband, a beam, or a set of REs or PRBs associated with the channel) is busy. In examples, an outcome of a channel assessment may be available when a channel is unoccupied, clear, or idle. An outcome of a channel assessment may be unavailable when a channel is occupied or busy. As shown in FIG. 2, the WTRU may send outcome(s) of the one or more of channel assessments based on the request message (e.g., the trigger 220). A WTRU may (e.g., as shown by example in FIG. 2) report that a subset of the indicated resources (e.g., subband 1 and/or subband 2) is clear and subband 3 is busy. The report may be sent using resource(s) that has been determined as available. As shown in FIG. 2, a WTRU may send one or more channel assessments outcomes using subband 1 or beam 1 (e.g., resource 222 on subband 1 or beam 1).

A WTRU may (e.g., subsequently) monitor (e.g., attempt to decode) or receive (e.g., decode) a transmission in a channel that is indicated as available (e.g., in subband 1 and/or subband 2 as shown in FIG. 2). As shown in FIG. 2, the WTRU may receive DL transmission using resource 224 that is associated with subband 1 and subband 2. In an example, a message triggering the report of receiver LBT (e.g., the request message) may include, for example, scheduling information for the upcoming DL transmission. A scheduling transmission may enable a WTRU to determine the resources where the DL transmission may (e.g., will) occur, for example, as a function of an information element in the scheduling message and the receiver LBT report provided by the WTRU. For example, scheduling information may indicate that the transmission may occur on one or more (e.g., all) subbands (e.g., the one or more subbands of one or more beams) where the receiver LBT has determined the channel to be idle/clear/available.

Request messages (e.g., trigger(s)) may be used to trigger reporting periodic receiver node channel assessment(s) (e.g., periodic receiver LBT).

A WTRU may be triggered to report periodic receiver node channel assessment(s), for example, for periodic channel assessment(s). The reporting may be periodic. The reporting may be semi-persistently periodic (e.g., triggered to report in a set of upcoming periodic resources). The reporting may aperiodic (e.g., triggered).

A reporting indication (e.g., a trigger used to trigger reporting periodic receiver LBT) may be determined (e.g., by the WTRU) based on one or more of: a reception of a DCI, a reception of a DCI for a DL assignment, MAC control element (MAC CE)(s), or timing.

An indication or trigger may be determined based on a reception of a DCI. For example, the WTRU may determine to transmit a periodic receiver node channel assessment report based on the reception and/or contents of a DCI.

An indication or trigger may be determined based on a reception of a DCI for a DL assignment. For example, a WTRU may be scheduled with a DL assignment. Such a scheduling may implicitly trigger the WTRU to report periodic receiver node channel assessment(s). In some examples, the scheduling DCI may include an element that may be used to trigger a periodic receiver node channel assessment report.

An indication or trigger may be determined based on MAC CE(s). For example, the WTRU may determine to transmit a periodic receiver node channel assessment report based on the presence and/or contents of a MAC CE.

An indication or trigger may be determined based on timing. A WTRU may transmit a periodic receiver node channel assessment(s) report based on a configurable schedule (e.g., based on received configuration information).

An indication or trigger may be determined based on (e.g., as a function of) the outcome of one or more channel assessments (e.g., LBT procedures). For example, the WTRU may transmit a periodic receiver node channel assessment(s) report if the channel assessment has failed or succeeded (or failed or succeeded multiple times in a window).

Receiver node channel assessment report (e.g., receiver LBT report(s)) may include various content(s).

A WTRU, for example, when triggered to report receiver node channel assessment(s) (e.g. periodic receiver LBT), may include one or more of the following in a receiver node channel assessment report: outcome(s) of the LBT procedure(s), the number of CCA to be used or required to determine channel is idle (e.g., unoccupied), outcome(s) of LBT procedure(s) associated to different thresholds, the difference(s) between the threshold(s) and the measurement(s) obtained, a set of periodic receiver node channel assessment resources for which the LBT procedure(s) was successful or failed, the number of failed or successful LBT procedures on a resource in a period of time, a histogram of successes or failures, or the number of consecutive successful or failed LBT procedures.

Outcome(s) of the channel assessment(s) (e.g., LBT procedure(s)) may be included in a report (e.g., a report for periodic receiver LBT). For example, the WTRU may report a set of channel assessment outcomes (e.g., either success(s) or failure(s)) corresponding to a set of periodic receiver node channel assessment resources (or corresponding to a set of subbands or beams). A success may indicate that the channel may be deemed unoccupied or idle at least in the periodic receiver node channel assessment resource(s). A failure may indicate that the channel may be deemed occupied or busy at least in the periodic receiver node channel assessment resource(s). The WTRU may report an outcome (e.g., a single outcome) for a set of LBT procedures. The set of outcomes to be processed (e.g., combined) using an AND or an OR operation, for example, to generate an outcome (e.g., the single outcome).

The number of CCAs used (e.g., required) to determine channel is unoccupied may be included in the report. For example, a WTRU may determine (e.g., need to determine) N CCAs are below a threshold for LBT to be deemed successful (or to consider the channel unoccupied). The WTRU may perform (e.g., need to perform) measurements on M (where M>N) CCAs in order to obtain N CCAs with measurements below threshold. The WTRU may report one or more of N or M or M-N.

Outcome(s) of LBT procedure(s) associated to different thresholds may be included in the report. For example, a WTRU may be configured with a set of thresholds. The WTRU may indicate whether the LBT (e.g., LBT procedure (s)) was successful for one or more of the set of thresholds. This may be used to improve power control.

The difference between the threshold and the measurement obtained may be included in the report. For example, a WTRU may report that a LBT procedure succeeded (e.g., given that the measured interference is below a threshold) or failed (e.g., given that the measured interference is above a threshold) and/or may report the difference between the measurement and the threshold.

A set of periodic receiver node channel assessment resources (e.g., periodic receiver LBT resources) for which the LBT (e.g., LBT procedure) was successful or failed may be included in the report. For example, the WTRU may report a set of indices. An (e.g., each) index may be associated with a periodic receiver LBT resource. The WTRU may report the set of indices associated to resources on which the LBT procedure succeeded. The WTRU may report the set of indices associated to resources on which the LBT procedure failed.

In examples, the number of failed or successful channel assessments (e.g., LBT procedures) on a resource in a period of time may be included in the report. For example, a periodic receiver LBT resource may be present multiple times in a window. The WTRU may perform LBT on an (e.g., each) instance of the periodic receiver LBT resource in a window. The WTRU may report the set of resources where LBT was successful and/or where it failed. The WTRU may report the number of times X, where the LBT was successful within the window. The WTRU may report the number of times Y, where the LBT failed in the window. The size and/or duration of the window may be configurable (e.g., based on received configuration information). The timing (e.g., an ending time of the window; a starting time of the window, for example, for a known duration; etc.) of the window may depend on the timing of the report of the periodic receiver LBT. The timing of the window may depend on the timing of the trigger of the periodic receiver LBT report. A histogram of successes or failures may be included in the report. The histogram may consider a set of thresholds to determine success or failure of LBT(s).

The number of consecutive successful or failed channel assessments (e.g., LBT procedures) may be included in the report. For example, a WTRU may report if an LBT has succeeded (or failed) multiple times (e.g., in a row), possibly in a window (e.g., as defined herein). A WTRU may report the number of consecutive times an LBT has been determined as a success (or failure).

A WTRU may perform certain operations (e.g., adapt its behaviors) after transmitting periodic receiver node channel assessment report (e.g., periodic receiver LBT report).

A WTRU may adapt its behavior after transmitting a periodic receiver node channel assessment report, based on (e.g., as a function of) the outcome of the periodic receiver node channel assessment reported (e.g., the outcome of the periodic receiver LBT reported).

A WTRU may determine the resources on which an associated DL assignment is to be transmitted based on (e.g., as a function of) the content of the periodic receiver node channel assessment report (e.g., periodic receiver LBT report). For example, a WTRU may be assigned a conditional frequency resource allocation for a DL assignment. The WTRU may determine the actual frequency resource allocation based on (e.g., as a function of) the contents of the periodic receiver node channel assessment report (e.g., periodic receiver LBT report).

A WTRU may monitor (e.g., attempt to decode) a resource (e.g., a subband or a beam) for a transmission from a device (e.g., a transmitting node), using the resource that has been determined and/or reported as available. In an example, a WTRU may adapt its PDCCH monitoring on one or more associated channels (e.g., subband and/or beam) associated with a periodic receiver LBT resource, for example, based on (e.g., as a function of) whether the LBT procedure succeeded or failed and whether the WTRU reported such. For example, if a WTRU determines that a channel (e.g., subband and/or beam) is busy, the WTRU may change (e.g., modify) the PDCCH monitoring in the channel to a first state or monitoring configuration (e.g., a monitoring configuration where the channel that is busy is not to be monitored). If the WTRU determines that a channel (e.g., subband and/or beam) is idle, the WTRU may change (e.g., modify) the PDCCH monitoring in the channel to a second state or monitoring configuration (e.g., a monitoring configuration where the channel that is idle is to be monitored). The state or monitoring configuration which a WTRU may change to, may be based on (e.g., depend on) the state or monitoring configuration that the WTRU was in prior to reporting the periodic receiver LBT. The WTRU may monitor (e.g., only monitor) synchronization signal (SS) blocks that correspond to the subband and/or beam (e.g., subband/beam combination) that is indicated as available.

The PDCCH monitoring configuration may be determined as a discontinuous reception (DRX) state or as a set of PDCCH monitoring occasions.

A WTRU may change (e.g., autonomously change) the set of periodic receiver node channel assessment resources (e.g., the set of periodic receiver LBT resources) that the WTRU monitors, for example, depending on the reported receiver node channel assessment (e.g., receiver LBT). For example, if a WTRU determines that LBT (e.g., LBT procedure(s)) on a (e.g., a first) periodic receiver LBT resource is failing repeatedly (or failing by a specific margin compared to a threshold), the WTRU may stop performing LBT on that periodic receiver LBT resource. The WTRU may begin performing LBT on another (e.g., a second) periodic receiver LBT resource. The second resource may be determined (e.g., selected) based on an index and/or from a set of configured but unmonitored periodic receiver LBT resources.

After transmitting a periodic receiver LBT report, a WTRU may request a change of channel (e.g., beam or subband).

A WTRU may trigger a LBT failure detection (and reporting) or radio link failure (RLF). For example, if a WTRU determines that periodic LBT on a periodic receiver LBT resource is failing repeatedly, the WTRU may trigger a LBT failure detection or an RLF.

A WTRU may request receiver node channel assessment (e.g., receiver LBT). For example, a WTRU may request that a node (e.g., a gNB or another WTRU) perform receiver LBT, which may help identify exposed nodes.

A WTRU may perform a channel assessment (e.g., LBT), for example, prior to transmitting to another node (e.g., a gNB or other WTRU). A WTRU may determine, for example, that there is interference in a transmission subband/beam. The WTRU may not be able to identify, for example, if the narrow-beam interference affects the intended receiver. The WTRU may transmit a request (e.g., for receiver LBT) to the intended receiving node, for example, using a second set of resources (e.g., a different beam than the beam originally used for the LBT and originally intended for the transmission). A WTRU may attempt to acquire the channel for a transmission to a second Transmission/Reception Point (TRP), for example, if a channel assessment (e.g., an LBT procedure) determines the channel is busy for a transmission to a first TRP. A WTRU may perform an associated UL transmission, for example, if a channel assessment (e.g., an LBT procedure) determines the channel is free for a transmission to the second TRP. A WTRU may request that a receiving node determine if there is an exposed node issue for transmissions to the first TRP (e.g., if an LBT procedure determines the channel is free for a transmission to the second TRP). A node (e.g., a gNB) may perform one or more channel assessments on one or more resources (e.g., subbands or beams). The node may determine that the one or more resources are available or busy. The node may transmit using the resource that is determined as available and receive feedback about the transmission that is made using the available resource.

A WTRU may receive an indication from an intended receiver, for example, that the intended receiver suffers from an exposed node. A WTRU may trigger the transmission of such an indication. A trigger may be, for example, a signal (e.g., an explicit signal) indicating a request for the receiving node to determine if there is an exposed node. A WTRU may (e.g., otherwise) perform a request (e.g., an implicit request), for example, by autonomously transmitting one or more UL signals, such as SRS, scheduling request (SR), or channel state information (CSI) feedback. A WTRU may monitor a (e.g., specific) set of resources (e.g., PDCCH candidates and/or time/frequency/spatial resources), for example, to detect and receive an indication (e.g., of a request).

A WTRU may (e.g., if the WTRU receives an indication there is no exposed node) determine that the WTRU may not perform its associated transmission (e.g., if LBT deems the channel busy). A WTRU may modify the parameters for a channel assessment (e.g., an LBT procedure) associated with its upcoming transmission, for example, if the WTRU receives an indication there is an exposed node. In an example, a WTRU may modify (e.g., as a function of whether there is an exposed node or whether the WTRU is unaware of the presence of an exposed node) at least one of the following: an energy detection (ED) threshold, a beam that may be used for directional LBT, an LBT type, a contention window size (CWS), and/or a channel access priority class (CAPC). In an example (e.g., for a beam that may be used for directional LBT), a WTRU may modify the beamwidth (e.g., from a very narrow beam up to and including an omni-directional LBT) and/or beam direction, for example, based on whether there is an exposed node or whether a WTRU is unaware if there is an exposed node. In an example, (e.g., for an LBT type), a decision may be made whether to use, for example, LBT CAT4, 25 us CAT2, 16 us CAT2 or other LBT category.

A transmitter (e.g., a WTRU or gNB) may broadcast a request for receiver node channel assessment(s) (e.g., receiver LBT) to a (e.g., any) node in the vicinity of the transmitter, for example, based on the transmitter performing LBT and determining a channel is busy). A request may indicate a set of resources on which the transmitter plans to perform a transmission. The request may indicate a set of resources on which other nodes may report receiver node channel assessment outcomes (e.g., receiver LBT outcomes). A parameter of (e.g., an additional and/or alternative) request may (e.g., implicitly) indicate the resources on which (e.g., that may be used) to perform receiver node channel assessment(s) (e.g., receiver LBT) and/or the resources on which to report the outcome of the receiver node channel assessment. For example, the timing of the report may be determined as a function of the timing of the request. A transmitting node making the request may monitor for reception of the one or more reports indicating the receiver node channel assessment outcome(s). A transmitting node may (e.g., immediately) transmit the associated transmission, for example, based on the report(s). A transmitting node may (e.g., alternatively, based on the reports) modify the parameters for the transmitting node's channel assessment (e.g., as listed above) or associated transmission.

Receiver node channel assessment (e.g., receiver LBT) may be performed or received, for example, prior to configured transmission(s). In an example, a WTRU may be configured with resources for UL transmissions, such as configured grant (CG) transmissions, physical uplink control channel (PUCCH), SRS, and the like. A WTRU may (e.g., to transmit on resources), perform a channel assessment (e.g., LBT) and then request receiver node channel assessment (e.g., receiver LBT) from the receiving node. In examples, a WTRU may (e.g., in the foregoing scenario) determine the parameters of the WTRU's LBT and of the requested receiver LBT, for example, based on the associated configured transmission. The type of LBT used by a WTRU and/or whether the WTRU requests receiver LBT by the WTRU's intended receiving node(s) may depend on, for example, whether the transmission occurs in an active COT. The type of LBT used by a WTRU and/or whether the WTRU requests receiver LBT by the WTRU's intended receiving node may depend on, for example, whether the COT is considered active at the intended receiving node.

A WTRU may (e.g., prior to transmitting on a configured resource) monitor for a reception of an indication (e.g., from an intended receiver) of the outcome of a preemptive channel assessment (e.g., preemptive receiver LBT). The preemptive channel assessment may be performed by a receiver (e.g., a receiving node). A WTRU may perform one or more channel assessments (e.g., LBT). LBT, an LBT operation, and an LBT procedure may be used interchangeably herein. The WTRU may modify a parameter of the WTRU's channel assessment(s) depending on if the WTRU receives an indication of the outcome of the preemptive channel assessment. The WTRU may modify a parameter of the configured transmissions associated with the WTRU's channel assessment(s) depending on if the WTRU receives an indication of the outcome of the preemptive channel assessment. In examples, the WTRU may modify a parameter of the WTRU's LBT and/or associated configured transmissions, for example, depending on whether the WTRU receives an indication (e.g., that receiver LBT determined a channel is or is not idle, or the content of the indication). For example, the WTRU may determine the parameter(s) of the WTRU's own LBT and/or parameter(s) of an associated configured transmission, depending on whether the WTRU received a receiver LBT indication and/or whether the indication states that the channel is busy or idle. One or more parameters (e.g., that may be modified based on whether the WTRU received indication of the outcome of receiver LBT from its intended receiving node), may include, for example, at least one of: a type of LBT, LBT beam parameter(s), a beam on which an associated transmission may be performed, time/frequency resource(s) on which an associated transmission may be performed, a modulation and coding scheme (MCS) for an associated transmission, a priority class of an associated transmission, and/or whether to include UCI in an associated transmission.

In an example (e.g., for a type of LBT), a WTRU may use a first LBT type, for example, if the WTRU receives an indication that receiver LBT has determined a channel is idle. The WTRU may use a second LBT type, for example, if the WTRU does not receive an indication of the outcome of a receiver LBT procedure. In an example (e.g., for LBT beam parameters), a WTRU's LBT beamwidth and/or beam direction may depend on, for example, if the WTRU has received an indication of the outcome of receiver LBT.

Parameters (e.g., any of the foregoing parameters) may (e.g., additionally) depend on the timing of the reception of the outcome of receiver node channel assessment (e.g., receiver LBT) and an associated WTRU transmission. In an example (e.g., if there is a large gap of time between the reception of the indication of the outcome of receiver LBT and an associated WTRU transmission), a WTRU may perform a first LBT type (e.g., CAT4 LBT) prior to a transmission, for example, regardless of the outcome of receiver LBT or regardless of the presence of the indication of the outcome. A WTRU may perform a second LBT type (e.g., CAT2 LBT) prior to a transmission, for example, if there is a small gap of time between a reception of an indication of an outcome of receiver LBT and the associated WTRU transmission.

For a configured transmission resource, a WTRU may be configured an associated resource on which it may attempt to detect and/or decode a receiver node channel assessment indication (e.g., a receiver LBT indication). The association may be one to one (e.g., one configured transmission resource associated to one receiver LBT indication resource), one to many (e.g., one configured transmission resource associated to multiple receiver LBT indication resources), or many to one (e.g., multiple configured transmission resources associated to one receiver LBT indication resource).

A WTRU may determine that a receiving node has deemed a channel idle (and ready to receive on the channel) if the WTRU receives a transmission from the receiving node on the channel, for example, in a time window associated with the timing of a configured transmission timing. For example, if a WTRU receives a DL transmission from a gNB for a signal or channel on a subband and/or beam prior to (e.g., within a configurable time period of) a configured transmission resource, the WTRU may use the configured transmission resource for a transmission on the subband and/or beam.

A device may receive a configuration message that indicates resources. The device may perform respective channel assessments on the indicated resources. The device may determine respective channel assessment outcomes associated with the indicated resources. The device may receive an indication/trigger to report one or more channel assessment outcomes associated with the indicated resources. The device may report the one or more channel assessment outcomes. The device may determine to receive and/or receive a transmission on a subband indicated as available or idle in the reported one or more channel assessment outcomes. Channel assessments and/or channel assessment outcome determinations may be periodic. Each respective channel assessment outcome may be clear/idle/available or busy. The one or more channel assessment outcomes may be associated with a subset of the indicated resources. The subset of the indicated resources may be a most recent set of resources or a specified subset of the indicated resources. The device may include a wireless transmit/receive unit (WTRU). The respective channel assessments may include a channel sensing or listen before talk (LBT) operation.

A device may receive an indication/trigger to report one or more previously determined channel assessment outcomes. The device may report the one or more previously determined channel assessment outcomes. The device may determine to receive and/or receive a transmission on a subband indicated as available or idle in the reported one or more previously determined channel assessment outcomes. The indication/trigger may be received from a transmitting node. The transmission on the subband may be from the transmitting node. The device may be a first wireless transmit/receive unit (WTRU). The transmitting node may be a network node, such as a base station or gNodeB, or, a second WTRU.

Although features and elements described above are described in particular combinations, each feature or element may be used alone without the other features and elements of the preferred embodiments, or in various combinations with or without other features and elements.

Although the implementations described herein may consider 3GPP specific protocols, it is understood that the implementations described herein are not restricted to this scenario and may be applicable to other wireless systems. For example, although the solutions described herein consider LTE, LTE-A, New Radio (NR) or 5G specific protocols, it is understood that the solutions described herein are not restricted to this scenario and are applicable to other wireless systems as well.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

What is claimed is:

1. A wireless transmit/receive unit (WTRU) comprising:

a processor configured to:

receive configuration information, wherein the configuration information indicates a first set of periodic resources associated with a first subband and a second set of periodic resources associated with a second subband;

perform a plurality of channel assessments, wherein the plurality of channel assessments comprises first channel assessments performed using the first set of periodic resources associated with the first subband and second channel assessments performed using the second set of periodic resources associated with the second subband;

receive a request to report channel assessment information;

send the channel assessment information based on the request, wherein the channel assessment information comprises a most recent channel assessment outcome that was determined from the plurality of channel assessments prior to receiving the request, and wherein the channel assessment information indicates that the first subband is available; and receive a transmission using the first subband.

2. The WTRU of claim 1, wherein the processor is configured to determine whether to receive the transmission using the first subband or the second subband based on the plurality of channel assessments, and the transmission is received based on a determination to receive the transmission using the first subband.

3. The WTRU of claim 1, wherein the channel assessment information indicates that the second subband is busy.

4. The WTRU of claim 1, wherein the processor is configured to determine a respective channel assessment outcome for each channel assessment of the plurality of channel assessments, a channel assessment outcome associated with the first channel assessments is sent in the channel assessment information.

5. The WTRU of claim 1, wherein the processor is further configured to:

determine a channel assessment outcome for a channel assessment of the plurality of channel assessments; and determine a parameter associated with a downlink transmission based on the channel assessment outcome, wherein the transmission is received based on the determined parameter.

6. The WTRU of claim 1, wherein the processor is further configured to:

receive, from a device, a channel assessment outcome determined by the device;

determine a channel assessment parameter based on the channel assessment outcome determined by the device; and perform a channel assessment based on the channel assessment parameter, wherein the channel assessment comprises a listen before talk (LBT) procedure.

7. The WTRU of claim 1, wherein the configuration information indicates configured grant (CG) information, and the processor is further configured to:

determine a parameter for sending an uplink (UL) transmission based on the CG information or based on a determination whether the WTRU receives, before a time when the UL transmission is to be sent, a channel assessment outcome determined by a device; and send the UL transmission based on the determined parameter.

8. The WTRU of claim 1, wherein the processor is configured to attempt to decode the transmission using the first subband based on a determination that the first subband is available, wherein the determination that the first subband is available is made based on the plurality of channel assessments.

9. The WTRU of claim 1, wherein the channel assessment information is sent using the first subband that is available.

10. A method performed by a wireless transmit/receive unit (WTRU), comprising:

receiving configuration information, wherein the configuration information indicates a first set of periodic resources associated with a first subband and a second set of periodic resources associated with a second subband;

performing a plurality of channel assessments, wherein the plurality of channel assessments comprises first channel assessments performed using the first set of periodic resources associated with the first subband and second channel assessments performed using the second set of periodic resources associated with the second subband;

receiving a request to report channel assessment information;

sending the channel assessment information based on the request, wherein the channel assessment information comprises a most recent channel assessment outcome that was determined from the plurality of channel assessments prior to receiving the request, and wherein the channel assessment information indicates that the first subband is available; and receiving a transmission using the first subband.

11. The method of claim 10, comprising determining whether to receive the transmission using the first subband or the second subband based on the plurality of channel assessments, and the transmission is received based on a determination to receive the transmission using the first subband.

12. The method of claim 10, wherein the channel assessment information indicates that the second subband is busy.

13. The method of claim 10, comprising determining a respective channel assessment outcome for each channel assessment of the plurality of channel assessments, a channel assessment outcome associated with the first channel assessments is sent in the channel assessment information.

14. The method of claim 10, comprising:

determining a channel assessment outcome for a channel assessment of the plurality of channel assessments; and determining a parameter associated with a downlink transmission based on the channel assessment outcome, wherein the transmission is received based on the determined parameter.

15. The method of claim 10, comprising:

receiving, from a device, a channel assessment outcome determined by the device;

determining a channel assessment parameter based on the channel assessment outcome determined by the device; and performing a channel assessment based on the channel assessment parameter, wherein the channel assessment comprises a listen before talk (LBT) procedure.

16. The method of claim 10, wherein the configuration information indicates configured grant (CG) information, and the method comprises:

determining a parameter for sending an uplink (UL) transmission based on the CG information or based on a determination whether the WTRU receives, before a time when the UL transmission is to be sent, a channel assessment outcome determined by a device; and sending the UL transmission based on the determined parameter.

17. The method of claim 10, wherein the channel assessment information is sent using the first subband that is available.

* * * * *